(12) United States Patent
Shrikhande et al.

(10) Patent No.: US 7,778,192 B2
(45) Date of Patent: Aug. 17, 2010

(54) SYSTEM AND METHOD FOR AUTOMATED DOUBLE-ENDED FIELD MANAGEMENT OF DSL SERVICE

(75) Inventors: Kapil Shrikhande, Berkeley, CA (US); Raghvendra G. Savoor, Walnut Creek, CA (US); Xidong Wu, Livermore, CA (US); Jin Wang, Walnut Creek, CA (US); John Van Slyke, Lafayette, CA (US); Richard D. Hart, Concord, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1170 days.

(21) Appl. No.: 11/288,969

(22) Filed: Nov. 29, 2005

(65) Prior Publication Data

US 2007/0121520 A1  May 31, 2007

(51) Int. Cl.
 *H04L 12/26* (2006.01)
(52) U.S. Cl. ............................................. 370/248
(58) Field of Classification Search ............... 370/241, 370/248, 251; 379/27.01–27.08, 28, 29.01–29.09, 379/29.1, 29.11, 30
 See application file for complete search history.

(56) References Cited

U.S. PATENT DOCUMENTS

| | | | |
|---|---|---|---|
| 4,639,557 A | 1/1987 | Butler et al. | |
| 4,841,560 A | 6/1989 | Chan et al. | |
| 5,130,936 A * | 7/1992 | Sheppard et al. | ............ 702/123 |
| 5,359,646 A | 10/1994 | Johnson et al. | |
| 5,479,473 A | 12/1995 | Zey | |
| 5,521,958 A * | 5/1996 | Selig et al. | .................... 379/21 |
| 5,533,093 A * | 7/1996 | Horton et al. | ................. 379/21 |
| 5,666,481 A | 9/1997 | Lewis | |
| 5,692,030 A | 11/1997 | Teglovic et al. | |
| 6,181,775 B1 * | 1/2001 | Bella | ....................... 379/29.01 |
| 6,246,754 B1 * | 6/2001 | Cole et al. | ............... 379/93.29 |
| 6,266,348 B1 * | 7/2001 | Gross et al. | .................. 370/493 |
| 6,516,053 B1 * | 2/2003 | Ryan et al. | ..................... 379/21 |
| 7,032,016 B2 | 4/2006 | Cerami et al. | |
| 7,515,691 B2 * | 4/2009 | Warner et al. | ............... 379/1.04 |
| 2002/0089999 A1 * | 7/2002 | Binde | ......................... 370/465 |

\* cited by examiner

*Primary Examiner*—Steven H Nguyen
*Assistant Examiner*—Alex Skripnikov
(74) *Attorney, Agent, or Firm*—Jackson Walker L.L.P.

(57) ABSTRACT

A system and method to perform double-ended measurements of a network is provided. The system includes a test device that makes measurements at the customer end and a portable computing device that interfaces with the test device, a customer gateway and database at a network location to analyze the data and determine a performance metric of the network.

18 Claims, 3 Drawing Sheets

SYSTEM AND METHOD FOR AUTOMATED DOUBLE-ENDED FIELD MANAGEMENT OF DSL SERVICE

BACKGROUND OF THE DISCLOSURE

1. Field of the Disclosure

The present disclosure relates to the field network services, such as digital subscriber line (DSL) services.

2. Background

Digital subscriber line DSL services, such as Internet access, Internet Protocol Television (IPTV), Video-on-Demand (VoD), Voice over Internet (VoIP), etc. are provided to subscribers or customers by service providers utilizing a DSL communications network. A typical DSL network includes various servers that form a backbone for the DSL network. These servers receive, among other things, DSL content (such as video, voice and data) from various sources and transmit the DSL content to central offices (COs) located in different geographical areas. Switches, such as Digital Subscriber Line Access Multiplexers (DSLAMs), distribute the DSL content to a customer equipment, and establish a communication between the customer. A DSLAM typically contains a plurality (a few hundred) of ports, each providing a dedicated connection to a subscriber or customer interface equipment, such as a modem (also referred herein as the customer gateway). The dedicated connection is typically a hard connection, such as copper wires.

When a DSL customer encounters a problem (such as being unable to receive a particular service or the quality level of a service being below an acceptable level) and that the problem can not be identified and/or corrected from a service provider location, i.e, remotely, a service personnel (typically a technician) is dispatched to the customer site to identify and resolve the problem. The service personnel, depending upon the nature of the problem, may perform several tests, including single-ended (from the customer's end) electrical measurements, obtain information about the service gateway, obtain information about the electrical measurements made at the central office end, and perform double-ended tests that may utilize a second service personnel at the central office end. The service personnel utilize such information to fix the problem. Such methods typically utilize a variety of field test devices and tend to be manually intensive. Also, such methods do not provide access from the field to certain network performance data that can be obtained or measured at various network locations. Thus, it is desirable to provide a more efficient system and method that can analyze measurement data obtained at the various locations in the DSL network.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, and wherein.

DETAILED DESCRIPTION OF THE DISCLOSURE

The present disclosure provides a system and method for automated double-ended field management of network services, such as DSL services.

In one aspect, the disclosure provides a portable field test set or equipment that includes a field test device, such as a DSL modem, that is configured to make double-ended tests from a customer end of the DSL line in conjunction with another test device (network device) that makes measurements at the other (network) end of the DSL line.

In another aspect, a portable computing device, such as a portable computer, is provided. The portable computer has access to the field test device and a customer interface that receives the network services over the DSL line. The portable computer has access to a server located in the network via a wireless network. A database accessible to the server stores data relating to various aspects of the network services, including but not limited to, test measurement data from the field test device and the, network test device, historical data relating to the network services, and higher-layer test data, etc.

In another aspect, the portable computing device receives data stored in the customer interface relating to the network services provided to the interface, and analyzes the data to identify or determine a performance metric. A performance metric may be any characteristic of the DSL services, including a physical layer characteristic or a DSL layer characteristic.

In another aspect, the portable computing device includes computer programs which include instructions or routines to receive data from the field test device, customer interface, and the database associated with the server.

In another aspect, the programs include instructions to analyze one or more data to determine a performance metric and to transmit the analysis and/or data to the server over a wireless network.

In another aspect, the programs include instructions to receive over the wireless network test video content that represents a selected quality level for the network service that can be displayed on the portable computing device.

In another aspect, the programs include instructions that enable the portable computing device to download in real-time the network service content being transmitted to the customer interface for viewing and analysis.

Figure 1:
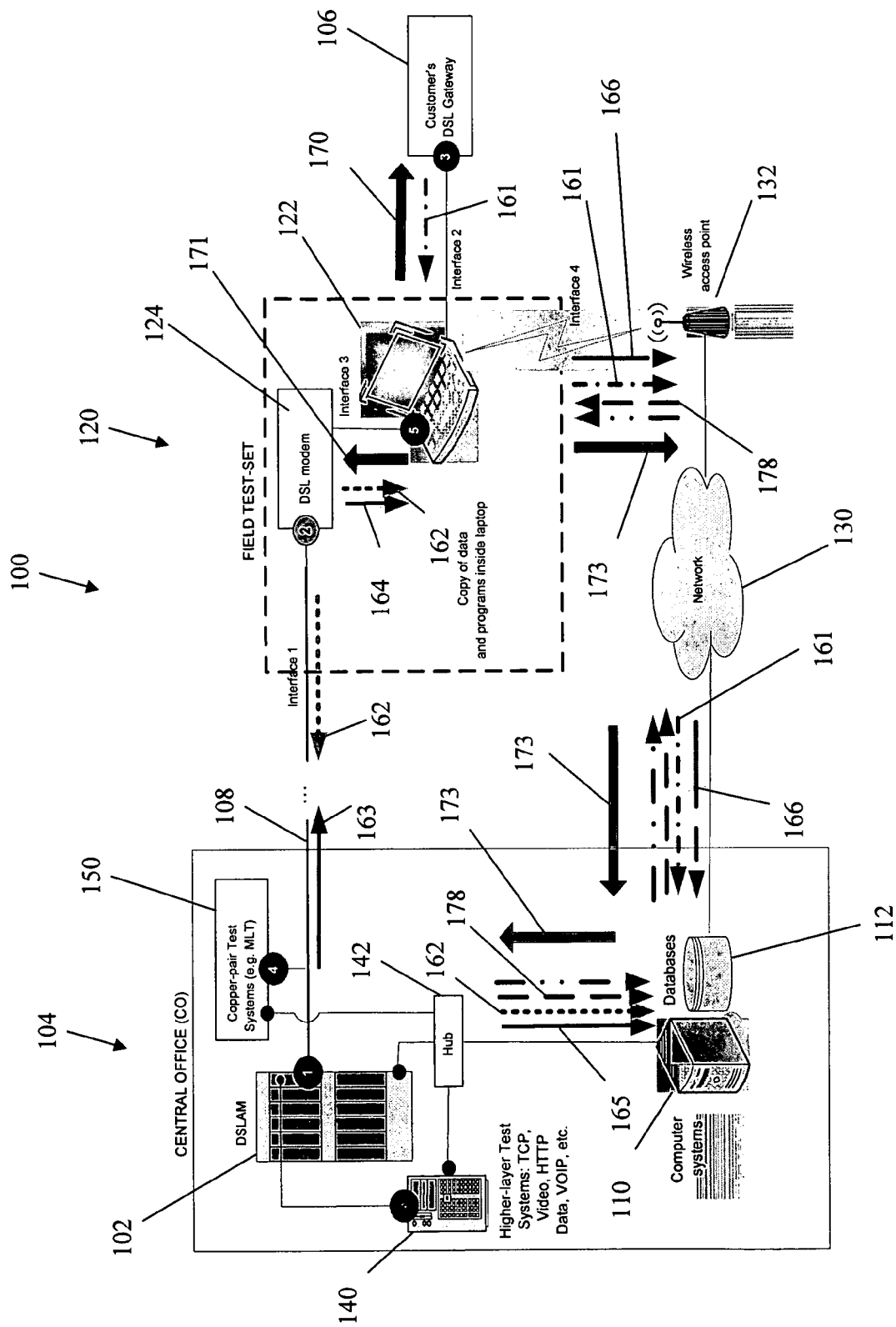
FIG. 1 is a functional diagram depicting an exemplary system according to one embodiment of the of the present disclosure.

FIG. 1 is a functional diagram of an exemplary system 100 for a double-ended management of network services (such as DSL services) according to one embodiment of the present disclosure. The system 100 provides both hardware and software that may be utilized to test, analyze, and verify the DSL services provided over a DSL network. DSL services may include services such as Internet access, Internet Protocol Television (IPTV), Video-on-Demand (VoD), Voice over Internet (VoIP), etc. For the purpose of this disclosure, the term DSL is meant to refer to all types of digital subscriber line technologies, including but not limited to ASDL, ADSL2, ADSL 2+, VDSL, VDSL 2 etc.

A DSL network typically includes a network backbone that includes a variety of servers which transmit DSL content (such as video, voice and data) to Digital Subscriber Line Access Multiplexers (DSLAMs). DSLAMs, sometimes also referred to as switches, are typically located in central offices of the service provider, each central office serving a geographical region. Each DSLAM provides a dedicated connection to multiple customers via customer premise equipment, such as a modem, also referred to herein as the customer interface or the customer gateway. The dedicated connection is typically a hard connection, such as copper line connections between the DSLAM and the customer gateway. The line also is referred to herein as the DSL line or link. When a customer has a problem that cannot be resolved remotely, such as from the central office, a service personnel is dispatched to the customer location to test the DSL line, customer gateway, etc., to resolve the problem.

The system 100 of the present disclosure provides hardware and software to perform a variety of tests at both ends of the DSL line, interface with the customer gateway and the network backbone, perform analysis, and identify and resolve problems associated with the DSL service provided to the customers, and to verify from the customer location the quality level of the network services.

FIG. 1 shows an exemplary DSLAM 102 located at a central office 104. Although the DSL network contains several central offices, each containing several DSLAMs, for ease of explanation and understanding, and not as a limitation, a single DSLAM is shown. The DSLAM 102 is shown connected to a customer gateway 106 via a DSL line 108. During normal operations, the DSL line 108 makes a direct connection between the DSLAM 102 and the customer gateway 106.

As shown in FIG. 1, the system 100 includes a computer system 110 having an associated database 112 that in one aspect acts as a central computer system to retrieve and store measurement data obtained by various test systems in the DSL network (as described in more detail below) and to interface with a field test set or equipment 120 over a wireless network 130 via a wireless port 132.

The field test set 120, according to one embodiment, includes a portable test device, also referred to herein as the "DSL modem" 124 and a portable computing device 122, such as a portable computer. The portable computer 122 may connect to and interface with the customer gateway 106 and the DSL modem 124 at the customer end and with the computer system 110 at the central office via the wireless Internet 130 through the wireless port 132. The DSL modem 124 connects to the customer end of the DSL line 108 to perform a variety of measurements, as described below in reference to FIG. 2. The portable computer 122 may interface with the customer gateway 106 via a general purpose interface, such as an Ethernet, a USB or serial port, etc. The system 100 further includes a copper test system 150, such as a system referred to as a metallic loop tester (MLT). The MLT 150 connects to the DSL line at the DSLAM end and can be activated remotely from the portable computer 122 to make electrical measurements, such as resistance, inductance, capacitance, conductance, etc.

As shown in FIG. 1, the system 100 further includes a higher-layer test system 140, which may be a computer system that executes programs that test connections at higher layers, such as TCP (Transmission Control Protocol), UDP (User Diagram Protocol), HTTP (Hypertext Transfer Protocol), etc., when the DSL line 108 is operating. The higher-layer test system 140 also runs application servers to which the portable computer 122 in the field may connect as a client to test the DSL content (video, voice and data), for example a video-clip. Thus, the portable computer may receive test content that represents a selected quality level of the network service. The customer gateway 106 maintains logs that may include a timestamp of recorded problems, a network layer that was affected (such as DSL, IP, etc.), and data about the health or performance of the local area network (LAN) inside the customer's premise.

Still referring to FIG. 1, the data measured by the higher-layer test system and the MLT at the service provider end is stored in the database 112 via a hub 142.

To test the DSL line 108, the portable computer 122 is connected to the customer gateway to run programs that retrieve the logs maintained by the customer DSL gateway. The retrieved data is sent by the portable computer 122 to the computer system 110 via the wireless network 130, 132, for storage in the database 112. Arrows 161 show the flow of the customer gateway log data to the database 112. To perform double-ended measurements, the DSL modem 124 is connected to the DSL line 108 at the customer end while the DSLAM is connected to the DSL line 108 at the other end, i.e. the network end. The DSL modem 124 and the DSLAM 102 are configured to make basic and advanced DSL measurements, as shown and described in reference to FIG. 2, and to exchange the measurement data so that the same data is available at both the ends of the DSL line 108 (i.e., at the customer or DSL modem end and the network or DSLAM end). The data flow from the DSL 124 modem to the DSLAM end is shown by arrow 162, which is stored in the database 112 as shown by the arrow 165. The flow of the data obtained by the MLT and DSLAM is shown by the arrow 163 to the DSL modem 124, which is accessible to the portable computer 122 as shown by the arrow 164. This data also is transferred to the database 112 via the hub 102, as shown by the arrow 165. Arrow 170 shows data flow of DSL-layer measurements made by the DSLAM and the DSL modem. Arrow 170 shows the flow of configuration comments from the test set to the customer gateway and the systems (DSLAM, server etc.) inside the central office 104.

Figure 2:
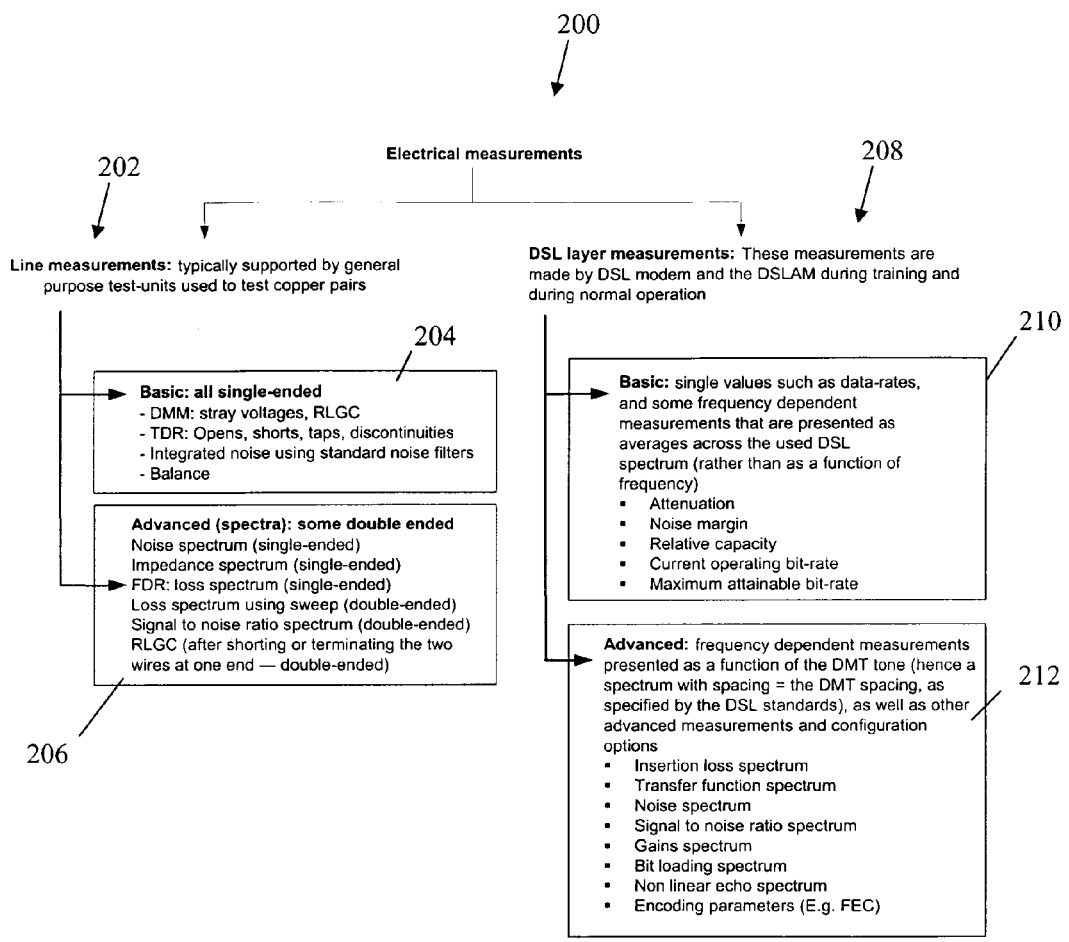
FIG. 2 is a block diagram showing exemplary electrical measurements made at various locations or nodes in the exemplary system of FIG. 1.

FIG. 2 shows exemplary electrical measurements 200 made at both ends of the DSL line 108. Line measurements 202 are typically made by general purpose electrical test equipment. Such measurements include basic single-ended measurements 204 and advanced measurements 206. The basic single-ended measurements include stray voltages, RLGC (resistance, inductance, conductance, and capacitance), TDR (time domain refractometry), opens, shorts, discontinuities, noise and balance. The advanced measurements 206 include single-ended measurement, such as noise spectrum, FDR (frequency domain refractometry), loss spectrum and double-ended measurements, such as loss-spectrum using sweep, signal to noise ration spectrum and RLGC after shorting or terminating two wires of the line 108 at one end.

In the exemplary system 100, the DSL modem 124 and DSLAM 102 make measurements 208 (referred to as the DSL layer measurements). The DSL layer measurements may be divided into basic measurements 210 and advanced measurements 212. The basic measurements 210 typically include data rate averages across the DSL spectrum, attenuation, noise margin, relative capacity, actual or current operating bit-rate and maximum attainable bit-rate. The advanced measurements typically are frequency-dependent measurements presented as a function of DMT tone (i.e. a spectrum with spacing that is equal to the DMT spacing, as specified by the DSL standards) as well as other desired advanced measurements and configuration. These measurements 212 typically may include insertion loss spectrum, transfer function spectrum, noise spectrum, signal-to-noise spectrum, gains spectrum, bit loading spectrum, non-linear echo spectrum, and encoding parameters (for example, forward error correction (FEC)).

In the exemplary system 100, the use of the DSLAM as a test unit at one end of the DSL line 108 enables making measurements without manual intervention. The above-noted spectral measurements are useful for troubleshooting the DSL line. Also, to qualify the DSL line 108 for bidirectional transmission, measurements taken at both ends of the DSL line may be needed. For example, noise measured at one end of the line 108 may be different from the noise measured at the other end. The present system makes such measurements and makes them and the other DSL layer measurements available to the database 112 and the portable computer 122.

Still referring to FIG. 1, the customer gateway data retrieved by the portable computer 122, the DSL line data measured by the DSLAM 102 and the modem 124, the copper-pair test data measured by the system 150, the higher layer data from the system 140 are stored in the database 112 and are retrievable by the portable computer 122 in the field in real-time. Additionally, historical DSL performance data for the DSL line 108 is stored in the database 112 and is accessible to the computer system 110 and the portable computer 122. The historical measurements may be the measurements that are made periodically, such as once a week, and stored in the database 112 (for example a few most recent measurements). Thus, the portable computer has access to the historical data for the DSL line 108 that can be correlated with the current or real-time measurements and displayed in the field on the portable computer 122 or another graphical user interface (GUI). Thus, to determine a problem with the DSL line, the following exemplary procedure may be utilized.

The portable computer 122 is connected to the residential gateway 106 to run designated programs in the portable computer. The programs retrieve the logs maintained by the customer gateway 106, which are analyzed to identify a problem. The retrieved data is transmitted to the database 112 via the wireless connections 130, 132 and stored in the database 112. The DSL modem 124 is then connected to the DSL line 108. The DSL modem 124 and the DSLAM 102 make the basic and DSL layer measurements, such as the measurements 210 and 212 respectively (FIG. 2). The system exchanges the measured data at both the ends of the line 108 so that the same data becomes available at both ends of the line. The measured data also is stored in the database 112 as shown by the arrows 162 and 165. Programs on the portable computer 122 retrieve and analyze the data from the DSLAM 102. These programs may identify the physical layer and DSL layer problems and provide a list of recommendations in real-time to the portable computer 122. The physical layer problems may include a short, an inadequate splice or an open relating to the DSL line 108. Sometimes, real-time measurements may not be adequate to identify the nature or extent of the problem. The portable computer may access the historical data from the database 112 over the wireless network and compare the real-time measurements with the historical data to identify the extent of the problem. For example, a substantial difference in the real-time measured loss spectra and the corresponding historical data may indicate problems with the line 108, such water in the line or an inadequate splice in the line, whereas the presence of excess noise may indicate that a disturber was recently turned on. In addition, the programs in the portable computer may be executed to configure the DSLAM 102 to activate a selected DSL profile and then monitor the performance in real-time for a pattern that may indicate a problem. For example, the portable computer may be utilized to enable interleaving and to check the improvement in bit rate error. A significant improvement may indicate the presence of an impulse noise. The portable computer 122 also may use a profile with high transmit power and check the data rate; a significant drop in the data rate may indicate the presence of signal dependent noise.

Once the problem has been identified, the portable computer is utilized to verify that the higher layer traffic is flowing at an acceptable rate and that the DSL services, such as video, voice, data or are being provided to the customer gateway 106 at selected quality levels. In this aspect, the portable computer can act as a client and set up a connection with an application server inside the central office or at any other place in the DSL network. This client-server model or connection enables the portable computer 122 to test TCP and HTTP throughputs and also enable the field personnel to view test or standard video and voice content, such as movie-clips, to determine and qualify the delivery of the video service to the customer gateway 106. Additionally, when the customer gateway 106 is connected to the DSL line 108, the portable computer may also be connected to the DSL line. The portable computer may then execute programs inside the portable computer to retrieve and view in real-time the service content received by the customer gateway 106. Thus, the system enables viewing of the DSL network content on a field device to check the quality level of the actual network content being delivered to the residential gateway 106.

Thus, the system of the present disclosure provides a single field test measurement device and portable computer for performing substantially all the field tests and analyses. It should be obvious that the field test measurement device and the portable computer may be integrated into a single device. The amount of manual intervention is relatively small, as the test measurements at both ends of the line are made substantially automatically by the DSL modem at the customer end without manual intervention at the network end, because the DSLAM acts as the second test unit. The DSLAM and the DSL modem exchange measurements made at their respective ends so all such measurements are available at both the ends of the DSL line. The computer programs perform correlation between various data, including between the DSL line measurements and the DSL performance measurements. The measurements made at any location in the network are stored in a database and made available for current and future use. The system also stores historical performance data of the DSL line that is being tested in the field. The historical data establishes a baseline for the field personnel to compare them to the real-time measurements. The portable computer can access data from the customer gateway and configure the customer gateway. The portable computer may access systems in the central office that aid troubleshooting in the field. For example, the field personnel may exchange the DSL profile, and initiate an MLT test from the field. Higher-layers (TCP, HTTP, etc.) may be tested for throughput by the servers located inside a central office, and software acting as a client on the portable computer in the field can retrieve such data. Also, applications such as video can be viewed in real-time on the portable computer at the customer end.

Figure 3:
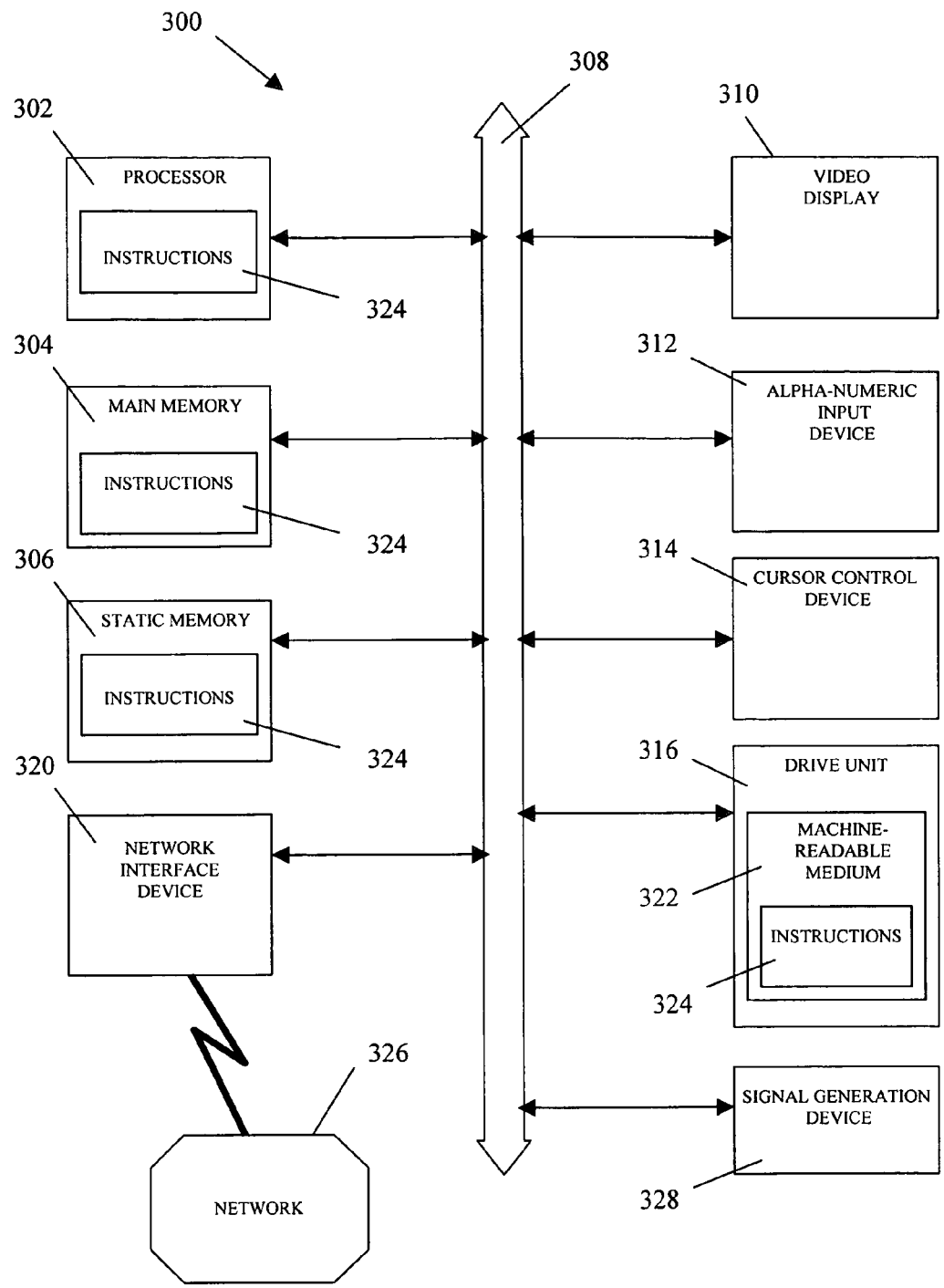
FIG. 3 is a diagrammatic representation of a machine in the form of a computer system within which a set of instructions, when executed, may cause the machine to perform any one or more of the methodologies of the present disclosure.

Turning now to FIG. 3, FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a portable computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated in herein above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more machine-readable medium as listed herein and including art-recognized equivalents, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather, the disclosure extends to all functionally equivalent structures, methods, and uses such as are within the scope of the appended claims.

In accordance with various embodiments of the present disclosure, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

What is claimed is:

1. A non-transitory machine-readable storage medium comprising machine executable instructions, the instructions comprising:
   an instruction to receive a data from a customer interface when a portable computing device is connected to the customer interface;
   an instruction to receive test measurements from a portable test device when the portable computing device is connected to the portable test device, wherein the portable test device configured to make test measurements at a first end of a line;
   an instruction to receive test measurements from a network device configured to make test measurements at a second end of the line;
   an instruction to receive a data stored in a database via a wireless network, wherein the database, accessible to a server, for storing data relating to a network service provided to the customer interface over the line; and
   an instruction to analyze one of the data to determine a performance metric relating to the network service;
   wherein the portable test device and the network device both being configured to exchange their respective test measurements and to store data relating to the test measurements made by the portable test device and the network device.

2. The non-transitory machine-readable storage medium of claim 1, wherein the instructions further comprise an instruction to configure the portable test device and network device to make double-ended measurements on the line and to transfer the double-ended measurements to the portable test device.

3. The non-transitory machine-readable storage medium of claim 1, wherein the instructions further comprise an instruction to transfer the data received from the customer interface to the server.

4. The non-transitory machine-readable storage medium of claim 1, wherein the database stores a higher layer test data and wherein the instructions further comprise an instruction to receive the higher layer test data over the wireless network.

5. The non-transitory machine-readable storage medium of claim 1, wherein the instructions further comprise an instruction to receive a test video content from the database that represents a selected level of quality for the network service.

6. The non-transitory machine-readable storage medium of claim 1, wherein the instructions further comprise an instruction to receive at the portable computing device in real-time a content relating to the network service transmitted to the customer interface.

7. An apparatus, comprising:
   a portable computing device having a processor;
   a machine-readable storage medium accessible to the processor, the storage medium including processor executable instructions, the instructions including:
      an instruction to receive a data from a customer interface when a portable computing device is connected to the customer interface;
      an instruction to receive test measurements from a portable test device when the portable computing device is connected to the portable test device, wherein the portable test device configured to make test measurements at a first end of a line;
      an instruction to receive test measurements from a network device configured to make test measurements at a second end of the line;
      an instruction to receive a data stored in a database via a wireless network, wherein the database, accessible to a server, for storing data relating to a network service provided to the customer interface over the line; and
      an instruction to analyze one of the data to determine a performance metric relating to the network service;
   wherein the portable test device and the network device both being configured to exchange their respective test measurements and to store data relating to the test measurements made by the portable test device and the network device.

8. The apparatus of claim 7, wherein the instructions further comprise
   an instruction to configure the portable test device and network device to make double-ended measurements on the line and to transfer the double-ended measurements to the portable test device.

9. The apparatus of claim 7, wherein the instructions further comprise an instruction to transfer the data received from the customer interface to the server.

10. The apparatus of claim 7, wherein the database stores a higher layer test data and wherein the instructions further comprise an instruction to receive the higher layer test data over the wireless network.

11. The apparatus of claim 7, wherein the instructions further comprise
   an instruction to receive a test video content from the database that represents a selected level of quality for the network service.

12. The apparatus of claim 7, wherein the instructions further comprise an instruction to receive at the portable computing device in real-time a content relating to the network service transmitted to the customer interface.

13. A system suitable for use with a server, a database, accessible to the server, for storing data relating to a network service provided to a customer interface over a line, a portable test device configured to make test measurements at a first end of the line, and a network device configured to make test measurements at a second end of the line, the portable test device and the network device both being further configured to exchange their respective test measurements and to store data relating to the test measurements made by the portable test device and the network device, comprising:
- a processor having access to the customer interface, portable test device and server, a computer readable storage medium that is accessible to the processor, the storage medium including processor executable instructions, the instructions including:
- an instruction to receive data from the customer interface when a portable computing device is connected to the customer interface;
- an instruction to receive test measurements from the portable test device when the portable computing device is connected to the portable test device;
- an instruction to receive the data stored in the database via a wireless network; and
- an instruction to analyze one of the data to determine a performance metric relating to the network service.

14. The system of claim 13, wherein the instructions further comprise an instruction to configure the portable test device and network device to make double-ended measurements on the line and to transfer the double-ended measurements to the portable test device.

15. The system of claim 13, wherein the instructions further comprise an instruction to transfer the data received from the customer interface to the server.

16. The system of claim 13, wherein the database stores a higher-layer test data and wherein the instructions further comprise an instruction to receive the higher layer test data over the wireless network.

17. The system of claim 13, wherein the instructions further comprise an instruction to receive a test video content from the database that represents a selected level of quality for the network service.

18. The system of claim 13, wherein the instructions further comprise an instruction to receive at the portable computing device in real-time a content relating to the network service transmitted to the customer interface.

* * * * *